United States Patent
Carroll et al.

(10) Patent No.: US 11,641,419 B2
(45) Date of Patent: May 2, 2023

(54) COMPUTER-GENERATED SPEECH DETECTION

(71) Applicant: ValidSoft Limited, Dublin (IE)

(72) Inventors: Patrick Matthew Carroll, Dublin (IE); John Petersen, Dublin (IE); Alexander Korff, Dublin (IE)

(73) Assignee: ValidSoft Limited, Dublin (IE)

( * ) Notice: Subject to any disclaimer, the term of this patent is extended or adjusted under 35 U.S.C. 154(b) by 0 days.

(21) Appl. No.: 17/365,641

(22) Filed: Jul. 1, 2021

(65) Prior Publication Data

US 2022/0014620 A1 Jan. 13, 2022

(30) Foreign Application Priority Data

Jul. 7, 2020 (GB) .................................... 2010427

(51) Int. Cl.
| | |
|---|---|
| *H04M 3/00* | (2006.01) |
| *H04M 3/22* | (2006.01) |
| *G10L 25/78* | (2013.01) |
| *H04M 3/436* | (2006.01) |

(52) U.S. Cl.
CPC .......... *H04M 3/2281* (2013.01); *G10L 25/78* (2013.01); *H04M 3/436* (2013.01)

(58) Field of Classification Search
CPC ...... H04M 3/2281; H04M 3/436; G10L 25/78
USPC .......................... 379/201.01, 266.08, 266.07
See application file for complete search history.

(56) References Cited

U.S. PATENT DOCUMENTS

| | | | |
|---|---|---|---|
| 4,847,905 A | 7/1989 | Lefevre et al. | |
| 5,436,965 A * | 7/1995 | Grossman | H04M 3/36 379/112.01 |
| 5,548,681 A | 8/1996 | Gleaves et al. | |
| 5,596,675 A | 1/1997 | Ishii et al. | |
| 5,796,791 A * | 8/1998 | Polcyn | G07B 17/0008 379/100.01 |
| 6,226,614 B1 | 5/2001 | Mizuno et al. | |
| 6,285,752 B1 * | 9/2001 | Rice | H04M 3/46 379/265.11 |
| 6,696,973 B1 | 2/2004 | Ritter et al. | |
| 7,558,383 B2 * | 7/2009 | Shtivelman | G06Q 10/107 379/265.12 |
| 7,616,748 B1 * | 11/2009 | Katz | H04M 3/436 379/200 |
| 9,466,299 B1 * | 10/2016 | Feltham | G10L 17/10 |
| 10,055,482 B2 * | 8/2018 | Yin | G06F 16/313 |
| 10,110,741 B1 * | 10/2018 | Cohen | H04M 3/436 |

(Continued)

FOREIGN PATENT DOCUMENTS

| | | |
|---|---|---|
| EP | 2843660 A1 | 3/2015 |
| WO | 2020027372 A1 | 2/2020 |

OTHER PUBLICATIONS

Intellectual Property Office Search Report under Section 17 for Application No. GB2010427.9, date of search Jan. 6, 2021; 1 pg.

(Continued)

*Primary Examiner* — William J Deane, Jr.

(74) *Attorney, Agent, or Firm* — Pillsbury Winthrop Shaw Pittman LLP

(57) ABSTRACT

A method for managing incoming voice calls, the method comprising:

receiving audio of a voice call;

determining whether the audio of the voice call is computer-generated; and terminating the voice call if it is determined that the audio of the voice call is computer-generated.

11 Claims, 6 Drawing Sheets

(56) References Cited

U.S. PATENT DOCUMENTS

| | | | |
|---|---|---|---|
| 10,277,737 B2* | 4/2019 | Bensman | H04M 3/4211 |
| 10,277,745 B1* | 4/2019 | Araujo | H04M 1/642 |
| 10,313,528 B2* | 6/2019 | Roy | H04L 65/103 |
| 10,523,814 B1* | 12/2019 | Moore | H04M 3/493 |
| 10,554,821 B1* | 2/2020 | Koster | H04M 3/436 |
| 2004/0001581 A1 | 1/2004 | Chen et al. | |
| 2004/0221320 A1 | 11/2004 | Andersen et al. | |
| 2007/0116208 A1* | 5/2007 | Williams | H04M 3/5158 379/90.01 |
| 2014/0119527 A1* | 5/2014 | Cohen | H04M 3/4365 379/207.13 |
| 2015/0195403 A1* | 7/2015 | Goulet | H04M 3/436 379/142.05 |
| 2017/0013122 A1 | 1/2017 | Cohen et al. | |
| 2018/0213421 A1 | 7/2018 | Horvitz et al. | |
| 2019/0052752 A1* | 2/2019 | Farrand | H04M 3/436 |
| 2019/0208055 A1* | 7/2019 | Bensman | H04M 3/436 |
| 2020/0043515 A1* | 2/2020 | Chae | G10L 25/18 |
| 2020/0169635 A1* | 5/2020 | Bidulock | H04M 3/436 |
| 2021/0037135 A1* | 2/2021 | Meredith | H04M 3/4365 |
| 2021/0327438 A1* | 10/2021 | Chu | G08B 13/1672 |

OTHER PUBLICATIONS

European Search Report in Application No. 21183539.2-1213 (PN775809EP), report dated Dec. 1, 2021 pp. 1-9.

* cited by examiner

COMPUTER-GENERATED SPEECH DETECTION

This application claims the benefit of UK patent application 2010427.9 filed 7 Jul. 2020 which is incorporated by reference herein.

This invention relates to managing incoming voice calls. Particular examples relate to the detection of computer-generated synthetic 'voice' calls to Interactive Voice Response (IVR) platforms using synthetic voice detection techniques.

BACKGROUND

Synthetic speech is audio data generated by computers and designed to sound to the human ear like a real human voice. Robotic speech is computer generated speech which is not designed to sound to the human ear like a real human voice, i.e. it is clearly computer generated or 'robotic' in nature. Robocalls are unsolicited computer-generated calls that may be marketing based, fraud based or simply nuisance calls. Robocalls are a type of voice call which may use either synthetic or 'robotic' speech. They are a major problem, with a US estimate putting Robocalls at over four billion per month in 2017. Current techniques rely on black-lists of blocked numbers, which become obsolete, and require updating, very quickly; or individual network detection of suspicious numbers which are also largely ineffective as well as being limited to single networks. These techniques are also designed for individual subscribers.

Interactive Voice Recognition (IVR) platforms allow users to interact with a host system via a telephone keypad or by speech recognition, allowing services to be inquired about through IVR dialogue. IVR platforms are designed to handle large volumes of incoming calls as well as having the capability to be used for outgoing calls. As such, computer-generated phone calls, often referred to as "robocalls" which use an auto-dialler to deliver a pre-recorded message can significantly slow down IVR platforms: a channel is tied up with the robocall, meaning it is unavailable for a genuine caller. Additionally, the robocall, being computer-generated, cannot follow the IVR prompts and therefore cannot choose correct workflow paths, for example, press or speak "one" for Sales. This in turn can lead to the IVR workflow having no choice but to hand the call over to a live agent. This is a problem because occupying a channel has an associated cost and occupying up an agent incurs even greater cost; robocalls waste both money and resources by occupying channels. Another problem is that robocalls skew abandonment rate statistics because automated calls are likely to finish with no result. It is therefore desirable to detect and terminate robocalls quickly, in order to limit the resources of the IVR platform which are used.

BRIEF SUMMARY OF THE DISCLOSURE

It is an aim of certain embodiments of the invention to solve, mitigate or obviate, at least partly, at least one of the problems and/or disadvantages associated with the prior art. Certain embodiments aim to provide at least one of the advantages described below.

According to a first aspect, there is provided a method for managing incoming voice calls, the method comprising:
  receiving audio of a voice call;
  determining whether the audio of the voice call is computer-generated; and
  terminating the voice call if it is determined that the audio of the voice call is computer-generated.

In an embodiment, the determining whether the audio of the voice call is computer-generated comprises calculating a score indicating a probability that the audio of the voice call is computer-generated; and
  wherein, when the score indicating the probability that the voice call is computer-generated is greater than a predefined threshold, the voice call is terminated.

In an embodiment, the determining whether the audio of the voice call is computer-generated comprises detecting silence in the audio indicating a human caller.

In an embodiment, the determining whether the audio of the voice call is computer-generated comprises detecting Dual Tone Multi-Frequency, DTMF, tones in the audio indicating a human caller.

In an embodiment, the method further comprises auto-dialling the number of the received voice call to determine whether the call is answered if the voice call is terminated;
  wherein the call being answered indicates that the voice call was made by a human caller.

According to a second aspect, there is provided an electronic device configured to:
  receive audio of a voice call;
  determine whether the audio of the voice call is computer-generated; and
  terminate the voice call if it is determined that the audio of the voice call is computer-generated.

In an embodiment, to determine whether the audio of the voice call is computer-generated the electronic device is further configured to:
  stream the received audio of the voice call to a server; and
  receive an indication of whether the voice call is computer-generated from the server.

In an embodiment, the electronic device is an Interactive Voice Recognition, IVR, platform.

In an embodiment, the electronic device is further configured to open a channel to the server.

According to a third aspect, there is provided a system comprising:
  the electronic device according to the second aspect; and
  a server configured to:
  receive audio of a voice call from the electronic device;
  determine whether the audio of the voice call is computer-generated; and
  transmit the result of the determination of whether the audio of the voice call is computer-generated to the electronic device.

In an embodiment, to determine whether the audio of the voice call is computer-generated, the server is further configured to calculate a score indicating a probability that the voice call is computer-generated; and
  wherein, when the probability that the voice call is computer-generated is greater than a predefined threshold, the electronic device is further configured to terminate the voice call.

In an embodiment, the server is further configured to determine whether the audio of the voice call is computer-generated by detecting silence in the audio;
  wherein the detection of silence in the audio indicates a human caller.

In an embodiment, the server is further configured to determine whether the audio is computer generated by detecting silence of Dual Tone Multi-Frequency, DTMF, tones in the audio of the voice call;
  wherein the detection of Dual Tone Multi-Frequency, DTMF, tones in the audio indicates a human caller.

In an embodiment, if the call is terminated, the server is further configured to auto-dial the number of the received voice call, wherein the call being answered indicates that the voice call was made by a human caller.

Another aspect of the invention provides a computer program comprising instructions arranged, when executed, to implement a method in accordance with any one of the above-described aspects. A further aspect provides machine-readable storage storing such a program.

BRIEF DESCRIPTION OF THE DRAWINGS

Embodiments of the invention are further described hereinafter with reference to the accompanying drawings, in which.

DETAILED DESCRIPTION

Figure 1:
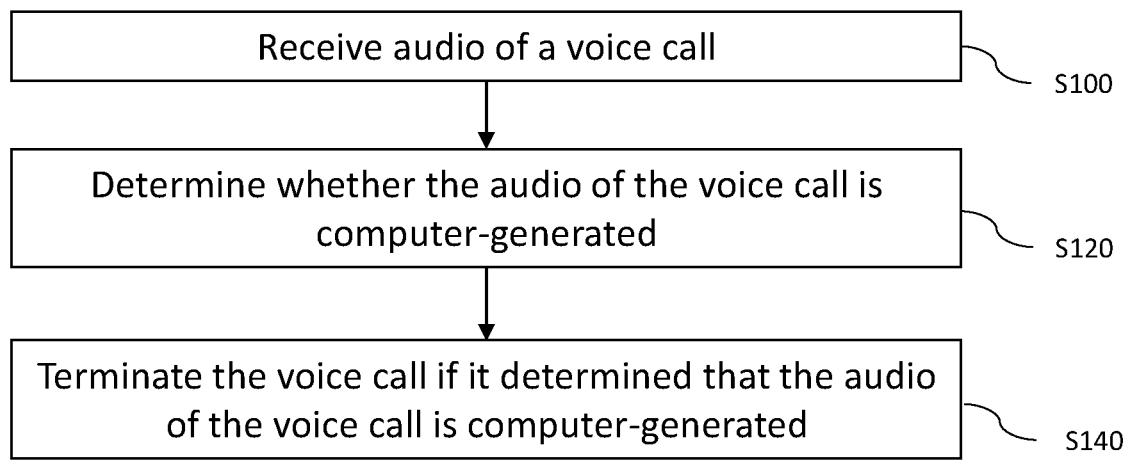
FIG. 1 is a flowchart showing an example of a method of managing incoming calls.

Robocalls, hereinafter referred to as "computer-generated voice calls", are not only computer-dialled; the actual spoken dialogue of the call is not a human caller speaking but is audio generated by text-to-speech software, hereinafter referred to as computer-generated audio (i.e. synthetic speech or robotic speech). The computer-generated audio could be 'robotic' speech, meaning it would be obvious to a human that it is not another human speaking, or it could use advanced synthetic speech tools to sound, to the human ear, like another human being. This latter case is referred to as synthetic speech.

Certain speech-based algorithms, normally found within voice biometric solutions, can detect a synthetic voice or a robotic voice from a human voice, even when a human would not be able to discern between the two. Synthetic or robotic voices can be detected by analysing frequency spectrum information, as well as detecting indicators of human callers such as silence and Dual Tone Multi-Frequency tones. It is this ability to detect a synthetic or robotic voice that forms the basis of this invention and allows IVR platforms to terminate computer-generated voice calls within seconds, thus quickly freeing valuable channels and avoiding expensive agent handovers.

To facilitate this, according to one example, upon an IVR answering the inbound voice call, a channel is opened to a detection engine and all audio, including silence, of the voice call coming from the caller is streamed to the detection engine.

Computer-generated calls generally start speaking immediately when they detect a sound from the called party, such as an IVR welcome script, so if computer-generated audio is not detected within a few seconds, the detection engine sends an indication that the voice call is legitimate to the IVR platform; alternatively, if computer-generated audio is detected, the detection engine sends a corresponding indication to the IVR platform which can terminate the voice call. Additionally, a legitimate call made by a human caller may include a period of silence and/or Dual Tone Multi-Frequency (DTMF) tones, both of which may indicate a human caller; and can therefore be used as indicators of computer-generated calls.

Where computer-generated audio is detected, the detection engine calculates a score indicating a probability that the audio of the voice call is computer-generated and provides the score to the IVR platform. The IVR platform would then terminate the call, provided the received score was above a predefined threshold. Alternatively, the detection engine may return a simple classification of the call as being human or computer generated.

Embodiments of the present invention will now be described.

In an embodiment of the present invention, a method of managing incoming voice calls is implemented wherein audio of a voice call is received, it is determined whether the audio of the voice call is computer-generated, and, if it is determined that the audio of the voice call is computer-generated, the voice call is terminated. It will be appreciated that this method may be implemented by an electronic device, a server, or may be shared between an electronic device and a server. For example, the method may be wholly carried out by an electronic device or may be wholly carried out by a server, or may be partially carried out by both an electronic device and a server, or the like.

The electronic device may be an IVR platform or server or may alternatively be a mobile phone or the like, capable of detecting computer-generated voice calls on an individual basis. The server may alternatively be a detection engine.

An example of this method of managing incoming voice calls is shown in FIG. 1.

In step S100, audio of a voice call is received. The audio of the voice call may be received directly by an electronic device answering the incoming voice call and thereby receiving the audio of the voice call directly. Alternatively, a server or the like may answer the incoming voice call and receive the audio of the voice call directly. Alternatively, the voice call, and therefore the audio of the voice call, may be received by an electronic device which may then stream the audio to a server; equally, the voice call may be received by the server which may stream audio of the voice call to the electronic device. That is, the remaining steps of FIG. 1 may be performed by the device which receives the voice call or by a separate device to which audio of the voice call is streamed.

In step S120, it is determined whether the audio of the voice call is computer-generated. The determination of whether the audio of the voice call is computer-generated may be carried out by the electronic device or by the server. The determination of whether the audio of the voice call is computer-generated may comprise the detection of silence in the audio of the voice call; the presence of silence in the audio of the voice call being an indicator of a human caller. Alternatively, or additionally, the determination of whether the audio of the voice call is computer-generated may comprise the detection of Dual Tone Multi-Frequency (DTMF) tones; the presence of DTMF tones being a further indicator of a human caller.

In step S140, if it is determined that the audio of the voice call is computer-generated, the voice call is terminated. The voice call may be terminated by the device which received the voice call or may be terminated remotely by another device which determines that the audio of the voice call is computer-generated.

For example, an electronic device may receive the incoming voice call and may stream the audio of the voice call to a server which may perform the determination of whether the audio of the voice call is computer-generated. The server may then indicate to the electronic device that the voice call is computer-generated, and the electronic device may then terminate the voice call. Alternatively, the server, having determined that the voice call is computer-generated, may terminate the voice call directly. Alternatively, the electronic device, or the server, may receive the incoming voice call, determine whether the audio of the voice call is computer-generated, and terminate the voice call directly (without the involvement of another device in the processing).

It will be appreciated that the electronic device of the previous example may be an Interactive Voice Recognition (IVR) platform or the like, and the server may be a detection engine or the like.

Figure 2:
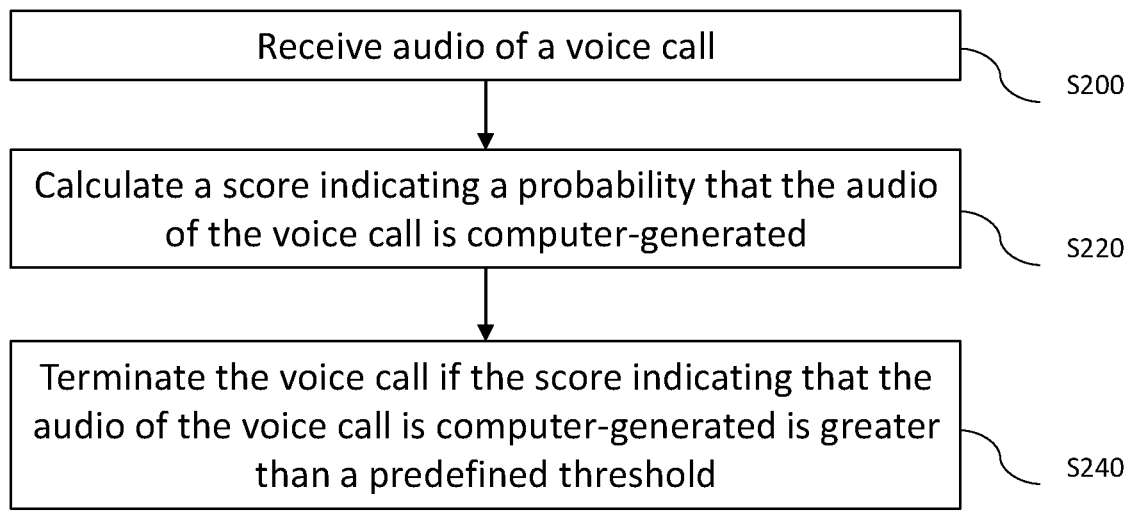
FIG. 2 is a flowchart showing another example of a method of managing incoming calls by an electronic device.

Another example of this method of managing incoming voice calls is shown in FIG. 2.

In step S200, a voice call is received. The voice call may be received by an electronic device. Alternatively, the voice call may be received by a server or the like.

In step S220, a score is calculated which indicates a probability that the audio of the voice call is computer-generated. The score may be calculated by the electronic device or, alternatively, may be calculated by the server. Alternatively, the server may calculate the score indicating a probability that the audio of the voice call is computer-generated. The calculation may comprise the detection of silence in the audio of the voice call. Alternatively, or additionally, the calculation may comprise the detection of Dual Tone Multi-Frequency (DTMF) tones.

In step S240, when the score indicating a probability that the audio of the voice call is computer-generated is greater than a predefined threshold, the voice call is terminated. The voice call may be terminated by the device which received the voice call or may be terminated remotely by another device which determines that the audio of the voice call is computer-generated.

For example, the electronic device may receive the incoming voice call and may stream the audio of the voice call to the server which may calculate a score indicating the probability that the audio of the voice call is computer-generated. The server may then transmit the score indicating the probability that the voice call is computer-generated to the electronic device which may then terminate the voice call. Alternatively, the server, having calculated the score, may terminate the voice call directly. Alternatively, the electronic device, or the server, may receive the incoming voice call and calculate the score indicating the probability of the audio of the voice call being computer-generated, and terminate the voice call directly.

It will be appreciated that the electronic device of the previous example may be an Interactive Voice Recognition (IVR) platform or the like, and the server may be a detection engine or the like.

It will be appreciated that the above described examples may be carried out by a single device or may be performed using multiple devices.

Figure 3:
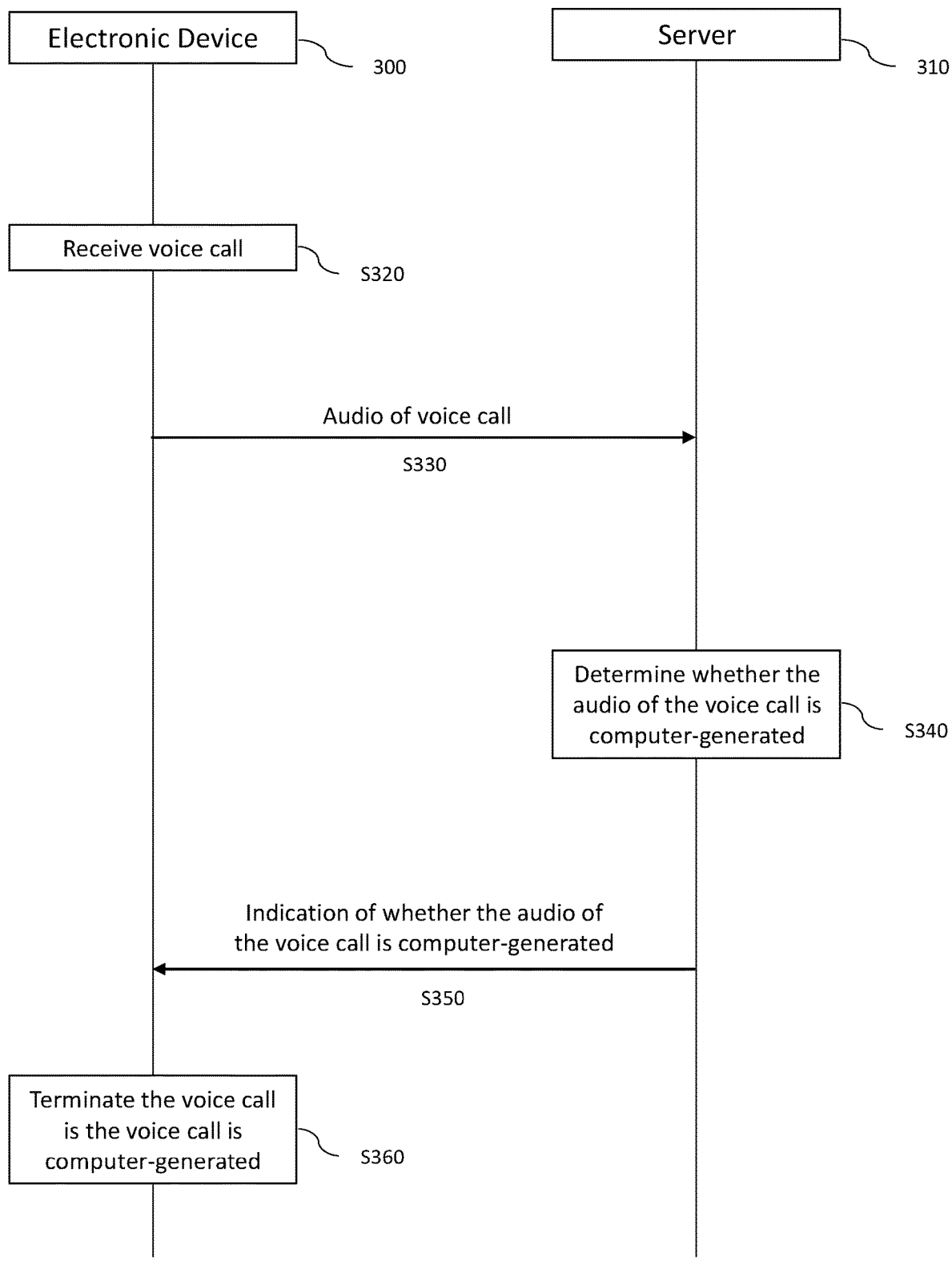
FIG. 3 is a diagram showing an example of a method of managing incoming calls by a system comprising an electronic device and a server.

FIG. 3 is a diagram showing a method of managing incoming voice calls as carried out by an electronic device 300 and a server 310. In step S320, the electronic device 300 receives the voice call and, in step S330, the audio of the voice call is transmitted by the electronic device 300 to the server 310. Alternatively, the server 310 may receive the voice call and may transmit the audio of the voice call to the electronic device 300. Alternatively, the electronic device 300 or the server 310 may receive the voice call and may not transmit the audio of the voice call to another device.

In step S340, the server 310 determines whether the audio of the voice call is computer-generated. The determination may comprise the detection of silence in the audio of the voice call; the presence of silence in the audio of the voice call being an indicator of a human caller. Alternatively, or additionally, the determination of whether the audio of the voice call is computer-generated may comprise the detection of Dual Tone Multi-Frequency (DTMF) tones; the presence of DTMF tones in the audio being an indicator of a human caller. Alternatively, the electronic device 300 may perform the determination of whether the audio of the voice call is computer-generated.

In step S350, the server 310 transmits an indication of whether the audio of the voice call is computer-generated to the electronic device 300. Alternatively, the electronic device may determine whether the audio of the voice call is computer-generated and may transmit a corresponding indication to the server 310. Alternatively, in the case that the electronic device 300 or the server 310 has performed all the previous steps of the method, step S350 may not be carried out at all.

In step S360, the electronic device 300 terminates the voice call if it has been determined that the audio of the voice call is computer-generated. Alternatively, the server 310 may terminate the voice call. In greater detail, the voice call may be terminated by the device which received the voice call, such as the electronic device, or may be terminated remotely by another device, such as the server, which determines that the audio of the voice call is computer-generated.

For example, the electronic device 300 may receive the incoming voice call and may stream the audio of the voice call to the server 310 which may perform the determination of whether the audio of the voice call is computer-generated and calculate a score indicating the probability that the audio of the voice call is computer-generated. The server 310 may then transmit the score to the electronic device 300 that the voice call is computer-generated and the electronic device 300 may then terminate the voice call. Alternatively, the server 310, having calculated the score, may terminate the voice call directly. Alternatively, the electronic device 300, or the server 310, may receive the incoming voice call, calculate the score indicating the probability of the audio of the voice call being computer-generated, and terminate the voice call directly.

It will be appreciated that the electronic device 300 of the previous example may be an Interactive Voice Recognition (IVR) platform or the like, and the server 310 may be a detection engine or the like.

Figure 4:
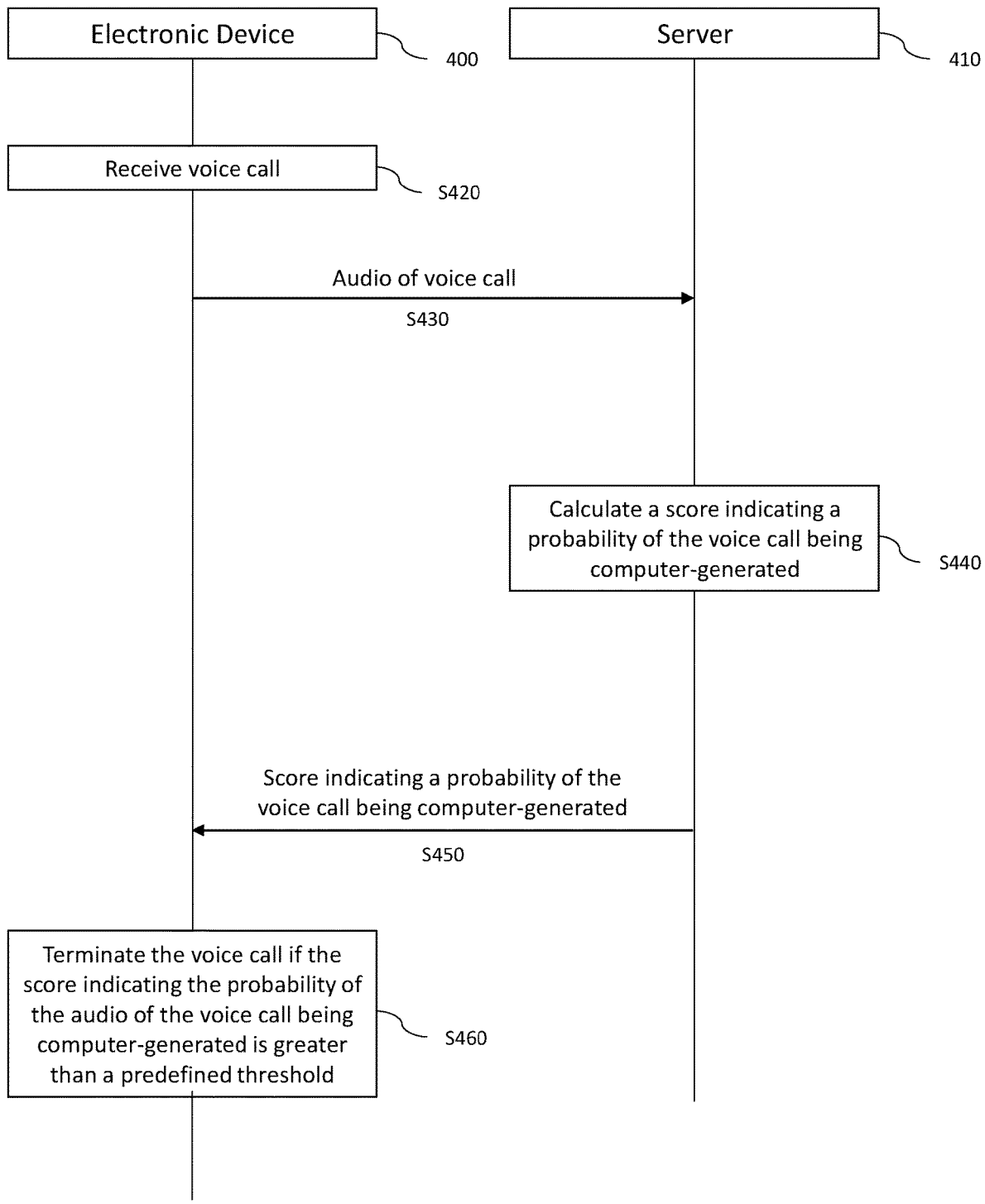
FIG. 4 is a diagram showing another example of a method of managing incoming calls by system comprising an electronic device and a server.

FIG. 4 is a diagram showing an alternative method of managing incoming voice calls as carried out by an electronic device 400 and a server 410. In step S420, the electronic device 400 receives a voice call and transmits audio of the voice call to the server 410 in step S430. Alternatively, the server 410 may receive the voice call and may transmit the audio of the voice call to the electronic device 400. Alternatively, the electronic device 400 or the server 410 may receive the voice call and may not transmit the audio of the voice call to another device.

In step S440, the server 410 calculates a score indicating a probability of the voice call being computer-generated and, in step S450, transmits the score to the electronic device 400.

Alternatively, the electronic device 400 or the server 410 may calculate the score and may not transmit the score to another device.

The calculation may comprise the detection of silence in the audio of the voice call; the presence of silence in the audio of the voice call being an indicator of a human caller. Alternatively, or additionally, the calculation of whether the audio of the voice call is computer-generated may comprise the detection of Dual Tone Multi-Frequency (DTMF) tones; the presence of DTMF tones in the audio of the voice call being an indicator of a human caller. Alternatively, the electronic device 400 may perform the calculation of whether the audio of the voice call is computer-generated.

In step S460, the electronic device 400 terminates the voice call if the score received from the server 410 indicating the probability of the audio of the voice call being computer-generated is greater than a predefined threshold. The predefined threshold may be defined such that the confidence that the audio of the voice call is computer-generated is very high, thereby minimising the likelihood that the determination is a mistake. Alternatively, the server 410 may terminate the voice call if the score indicating the probability of the audio of the voice call being computer-generated is greater than a predefined threshold. Additionally, the score indicating the probability of the audio of the voice call being computer-generated may be used to perform additional measures to ensure human callers are not mistaken as computer-generated voice calls. For example, if the score were approaching the threshold at which it is determined that the audio of the voice call is computer-generated, an additional check may be performed. An additional check may include auto-dialling the number of the voice call if the voice call is terminated to check whether the call is answered; the call being answered would indicate a human caller.

It will be appreciated that the electronic device of the previous example may be an Interactive Voice Recognition (IVR) platform or the like, and the server may be a detection engine or the like.

Figure 5:
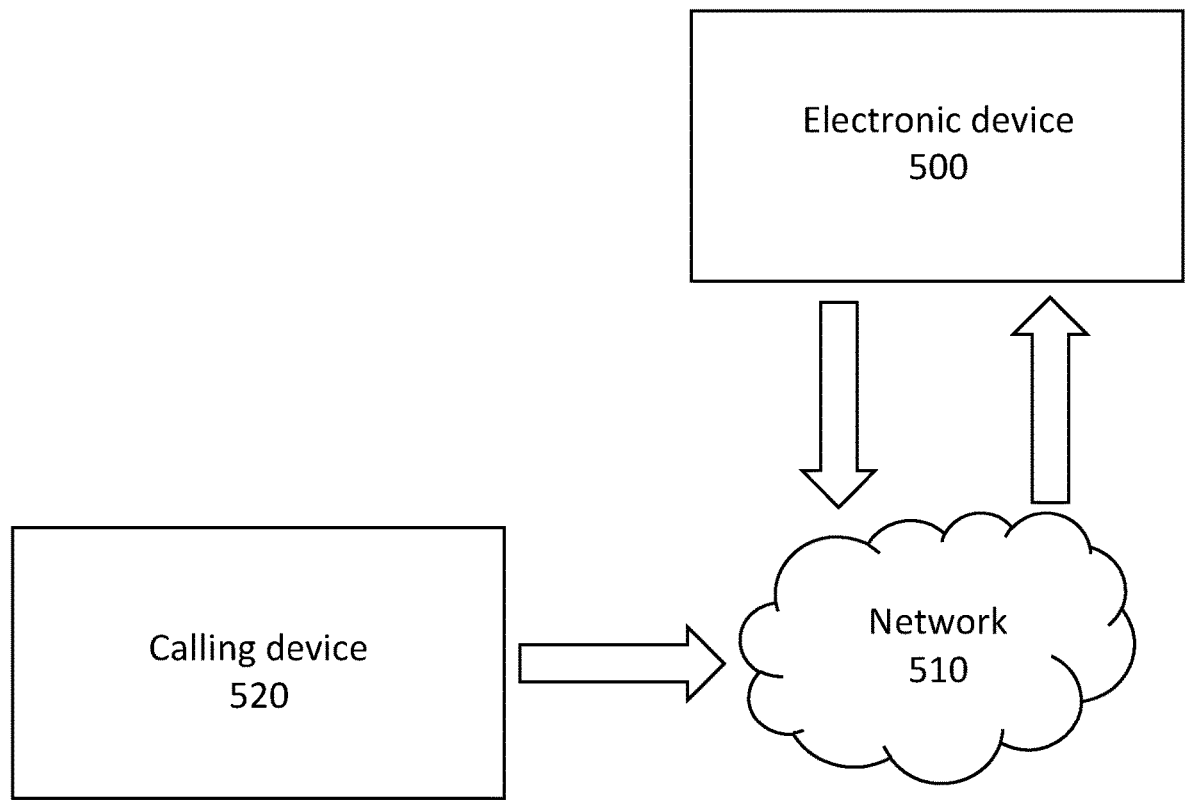
FIG. 5 is a system diagram showing an example of an interaction between an electronic device, a calling device, and a network.

FIG. 5 is a system diagram showing the interaction between an electronic device 500, a calling device 520, and a network 510. The calling device 520 connects with the network 510, transmitting a voice call, and the network 510 relays the voice call to the electronic device 500, which proceeds to determine whether the audio of the voice call is computer-generated. If it is determined that the voice call is computer-generated, the electronic device 500 terminates the voice call via the network 510, which disconnects the calling device 520.

It will be appreciated that the method performed by the electronic device 500 may be carried out by the server 520 or the like.

Figure 6:
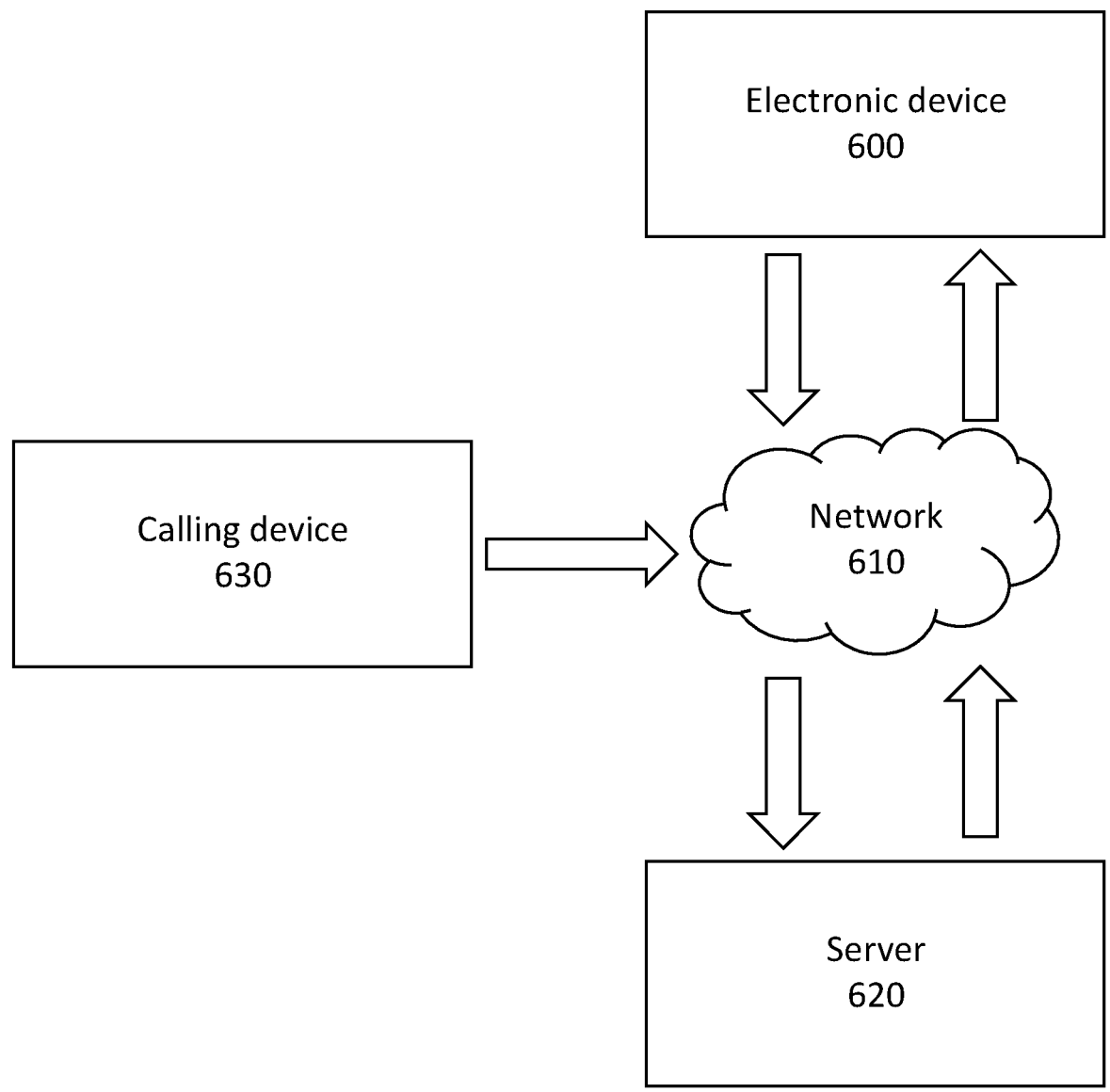
FIG. 6 is a system diagram showing an example of an interaction between an electronic device, a calling device, a server, and a network.

FIG. 6 is a system diagram showing the interaction between an electronic device 600, a server 620, a calling device 630 and a network 610. The network 610 receives an incoming voice call from the calling device 630 and forwards the voice call to the electronic device 600. The electronic device 600 receives the incoming voice call via the network 610 and streams the audio of the voice call to the server 620 via the network 610. The server 620 determines whether the audio of the voice call is computer-generated and transmits a corresponding indication to the electronic device 600 via the network. Alternatively, the server 620 may determine whether the audio of the voice call is computer-generated and calculate a score indicating a probability that the voice call is computer-generated; the server 620 may then send the score to the electronic device 600 via the network 610. The electronic device 600 may then terminate the voice call, if it is determined that the audio of the voice call is computer-generated.

It will be appreciated that the method performed by the electronic device 600 may be carried out by the server 620 or the like and that the method performed by the server 620 may be carried out by the electronic device 600 or the like.

It will be appreciated that embodiments of the present invention can be realized in the form of hardware, software or a combination of hardware and software. Any such software may be stored in the form of volatile or non-volatile storage, for example a storage device like a ROM, whether erasable or rewritable or not, or in the form of memory, for example RAM, memory chips, device or integrated circuits or on an optically or magnetically readable medium, for example a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium, for example a communication signal carried over a wired or wireless connection and embodiments suitably encompass the same.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for managing incoming voice calls, the method comprising:
    answering, by an Interactive Voice Recognition (IVR) platform, an incoming voice call;
    upon answering of the voice call by the IVR platform, streaming, by the IVR platform to a server in conjunction with the IVR maintaining the incoming voice call, the audio of the voice call;
    determining, by the server using the audio streamed to the server by the IVR platform, whether the audio of the voice call is a computer-generated voice or a human voice by analysing frequency spectrum information of the audio of the voice call;
    providing, from the server to the IVR platform in response to determining that the audio of the voice call is a computer-generated voice, an indication that the audio of the voice call is a computer-generated voice; and
    terminating, by the IVR platform in response to receiving the indication that the audio of the voice call is a computer-generated voice, the voice call.

2. The method of claim 1, wherein determining whether the audio of the voice call is a computer-generated voice or a human voice comprises:
    calculating a score indicating a probability that the audio of the voice call is a computer-generated voice; and
    determining that the probability that the voice call is a computer-generated voice is greater than a predefined threshold.

3. The method of claim 1, wherein determining whether the audio of the voice call is a computer-generated voice or a human voice comprises detecting whether there is silence in the audio indicating a human caller.

4. The method of claim 1, wherein determining whether the audio of the voice call is a computer-generated voice or a human voice comprises detecting whether there are Dual Tone Multi-Frequency, DTMF, tones in the audio indicating a human caller.

5. The method of claim 1, further comprising auto-dialling, in response to the terminating of the voice call by the electronic device, the number of the received voice call to determine whether the call is answered;
    wherein the call being answered indicates that the voice call was made by a human caller.

6. A system for managing incoming voice calls, the system comprising:
    an Interactive Voice Recognition (IVR) platform; and
    a server,
    the IVR platform configured to:
        answer an incoming voice call;
        upon answering the voice call, stream, to the server in conjunction with maintaining the incoming voice call, the audio of the voice call;
    the server is configured to:
        determine whether the audio of the voice call is a computer-generated voice or a human voice by analysing frequency spectrum information of the audio of the voice call; and
        provide, to the IVR platform in response to determining that the audio of the voice call is a computer-generated voice, an indication that the audio of the voice call is a computer-generated voice,
    the IVR platform further configured to:
        terminate, in response to receiving the indication that the audio of the voice call is a computer-generated voice, the voice call.

7. The system of claim 6, wherein the IVR platform is further configured to open a channel to the server.

8. The system of claim 6, wherein determining whether the audio of the voice call is a computer-generated voice or a human voice comprises:
    calculating a score indicating a probability that the voice call is a computer-generated voice; and
    determining whether the probability that the voice call is a computer-generated voice is greater than a predefined threshold.

9. The system of claim 6, wherein determining whether the audio of the voice call is a computer-generated voice or a human voice comprises detecting whether there is silence in the audio indicating a human caller.

10. The system of claim 6, wherein determining whether the audio of the voice call is a computer-generated voice or a human voice comprises detecting whether there are Dual Tone Multi-Frequency, DTMF, tones in the audio of the voice call indicating a human caller.

11. The system of claim 6, wherein the server is further configured to, in response to terminating of the voice call in response to receiving the indication that the audio of the voice call is a computer-generated voice, auto-dial the number of the received voice call; and
    wherein the call being answered indicates that the voice call was made by a human caller.

\* \* \* \* \*